United States Patent
Ryder et al.

(10) Patent No.: US 9,529,211 B2
(45) Date of Patent: Dec. 27, 2016

(54) EYEGLASS RETAINER

(71) Applicants: Karen Ryder, Dallas, TX (US); Andrew Streett, San Clemente, CA (US)

(72) Inventors: Karen Ryder, Dallas, TX (US); Andrew Streett, San Clemente, CA (US)

(*) Notice: Subject to any disclaimer, the term of this patent is extended or adjusted under 35 U.S.C. 154(b) by 0 days.

(21) Appl. No.: 14/830,513

(22) Filed: Aug. 19, 2015

(65) Prior Publication Data

US 2016/0054581 A1 Feb. 25, 2016

Related U.S. Application Data

(60) Provisional application No. 62/039,089, filed on Aug. 19, 2014.

(51) Int. Cl.
*G02C 3/00* (2006.01)

(52) U.S. Cl.
CPC ............................ *G02C 3/006* (2013.01)

(58) Field of Classification Search
CPC ..................................................... G02C 3/006
USPC .................................................. 351/157, 158
See application file for complete search history.

(56) References Cited

U.S. PATENT DOCUMENTS

| | | | |
|---|---|---|---|
| 2,704,961 A | 3/1955 | Weil | |
| 3,874,776 A | 4/1975 | Seron | |
| 4,696,556 A | 9/1987 | Perry, III | |
| 4,783,164 A | 11/1988 | Heiberger | |
| 4,818,094 A | 4/1989 | Lyons | |
| 4,927,258 A | 5/1990 | McKenna et al. | |
| 5,032,018 A | 7/1991 | McCulley et al. | |
| 5,079,388 A * | 1/1992 | Balsells | F16F 1/045 174/370 |
| 5,181,052 A | 1/1993 | McClellan | |
| 5,367,347 A | 11/1994 | Wilson et al. | |
| 5,507,075 A | 4/1996 | Tillstrom | |
| 6,817,069 B1 | 11/2004 | Tillstrom | |
| 7,562,978 B2 | 7/2009 | Chen | |
| 2015/0240900 A1* | 8/2015 | Poon | F16F 1/045 267/167 |

* cited by examiner

*Primary Examiner* — Huy K Mai
(74) *Attorney, Agent, or Firm* — Cozen O'Connor (57) ABSTRACT

An eyeglass holding device constructed of a cord wherein both terminal ends of the cord are secured to a U-shaped clip. Wherein each U-shaped clip utilizes a canted coil spring attached to the inner portion of the U-shaped clip, which, when a U-shaped clip is secured to each arm of the eyeglasses creates a loop such that the eyeglasses can be secured around the head or neck of a wearer.

17 Claims, 7 Drawing Sheets

EYEGLASS RETAINER

This application claims priority from U.S. Provisional Application Ser. No. 62/039,089, filed Aug. 19, 2014, the content of which is hereby incorporated by reference in its entirety.

FIELD OF INVENTION

The present application is generally related eyeglass clips, and more particularly to a U-shaped clip, capable of being connected to a tether, where a clip is secured over each of the arms of a pair of eyeglasses, which thereby provides for a secure retaining device for the eyeglasses.

BACKGROUND OF THE INVENTION

There are several types of eyeglass holders on the market. Typically, these holders utilize an elastomeric tubular material that secures to the end of the arms of the eyeglasses, so as to secure the holder to the eyeglasses. For example, U.S. Pat. No. 2,704,961. Please note, the term 'eyeglasses' will be used, but the use of this product encompasses all types of eye covering products, including sunglasses, reading glasses, decorative glasses, etc.

Additional variations have been created over the last 50 years that utilize other similar methods of securing a strap or securing device to a pair of eyeglasses or sunglasses wherein a friction device secures to the arms of the eyeglasses. For example, U.S. Pat. No. 5,032,018.

Further variations use a loop to slide onto the arm of the eyeglasses which is then secured via any number of means, including a ferrule, a clamp, a spring, a friction device, or simply by having an elastic loop mechanism. For Example, U.S. Pat. Nos. 3,874,776, 5,507,075, 6,817,069, 4,783,164, 4,927,258, 4,696,556, 4,818,094, 5,181,052, 5,367,347, and 7,562,978. Certainly, this is not an exhaustive list of variations on securing devices, however, each of the devices typically has a singular goal, which is to create a loop around the head or the neck of the wearer so that the eyeglasses are not lost by the person should the eyeglasses slide off the person's face or body.

There is another design type that addresses the same needs as above, and it is a cord that utilizes two alligator-type clips, one on each end. These are spring-loaded clips with two jaws (resembling an alligator). These clips can be attached to the arms of eyeglasses to create a loop to secure around the neck or head of the user.

Many of these devices are intended for athletic events, or for wearing in a moving vehicle, or other scenario where the eyeglasses may be lost. By having a loop that secures around the head or neck of the user, the eyeglass, if they are displaced from the face of the user, are not lost. Of course, this also allows a user to remove the eyeglasses and have them hang around the head or the neck of the wearer without being lost.

Though these products address a certain set of needs, there are many situations where these products are insufficient. For example, round loops (as mentioned above) provide a sufficient hold when in place, but often not large enough to fit around the r as of some sunglasses and can break over time. Alligator clips (also mentioned above) do not provide a secure enough hold in the way they are currently manufactured, and risk scratching eyeglasses when in place. Furthermore, these features are unsightly and take away from the design and look of the eyeglasses.

However, none of the prior art utilizes a U-shaped clamping device having slanted coil springs to secure the arm of the eyeglasses between one arm of the U-shaped device and the springs on the other arm of the U-shaped device. This is particularly relevant as many of the fashion glasses today have large cross-sections at both the eyeglass end and the termination end and wider arms that prevents the prior art holders from being properly secured. Further ore when used with fashion sunglasses or eyeglasses, many of the rubber, neoprene, or other string or cord type devices are not situation-appropriate.

SUMMARY OF THE INVENTION

An embodiment of an eyeglass retainer comprises a U-shaped body capable of securing around the arm of eyeglasses, wherein the eyeglass retainer comprises canted coil springs secured to the inside portion of one arm of the U-Shaped body, such that the coil spring is secured within the U-shaped body such that the circular opening is parallel to the width of the U-shaped body, and wherein the U-shaped body is pressed around an eyeglass arm, wherein the canted coil springs deflect to one side and apply constant pressure to the eyeglass arm, thereby securing the eyeglass retainer to the arm of the eyeglasses.

A further embodiment is an eyeglass retainer having a generally U-Shaped body, having a height, a width, and an opening length; wherein secured along at least one arm of the U-shaped body are canted coil springs, which are oriented sideways, so that the circular openings are positioned towards to the width of the U-shaped body; wherein an eyeglass arm of sufficient dimension to be positioned within the opening length, is positioned inside the U-shaped body, and wherein the coil springs are in contact with the eyeglass arm.

A method of securing a cord to a pair of eyeglasses comprising: attaching a U-shaped attachment mechanism to each terminal end of the cord, wherein each U-shaped attachment mechanism comprises at least one canted coil spring attached to the inner portion of the U-shaped attachment mechanism; and securing each of the two U-shaped attachment mechanisms to a portion of the eyeglasses, typically the arm.

An eyeglass retaining device comprising two U-shaped retainers and a retaining cord, wherein the ends of the retaining cord are attached to the U-shaped retainers; wherein the U-shaped retainer comprises a U-shaped body, having an opening on one side, wherein said opening is of sufficient depth to secure within said opening the arm of eyeglasses, wherein the U-shaped retainer comprises at least one canted coil spring secured to the inside portion of one arm of the U-Shaped body such that the spring extends along the width of the U-shaped body and is angled towards one side of the U-shaped body; and wherein the canted coil spring deflects in the direction it is angled upon a force being exerted upon said coil spring from an implement, whereby said canted coil spring provides consistent pressure against said implement.

An eyeglass retainer having a cord and two retaining members, each retaining member having a generally U-Shaped body, a height, a width, two sides, an opening length, and an attachment member for the cord positioned on one arm of the U-shaped body; wherein secured along at least one arm of the U-shaped body are three canted coil springs, which are oriented sideways, so that the circular openings are positioned towards to the width of the U-shaped body; and wherein the canted coil spring is cantilevered at an angle between about 1 and 30 degrees towards one side.

A method of securing a retaining cord to a pair of eyeglasses comprising: attaching a U-shaped attachment member to each terminal end of the cord, wherein each U-shaped attachment mechanism comprises a U-shaped body and a canted coil spring, wherein at least one canted coil spring is secured to the inside portion of one arm of the U-Shaped body and extending along the duration of the width of the U-shaped body and angled towards one side of the U-shaped body; securing a first U-shaped attachment mechanism to one eyeglass arm, wherein the canted coil spring deflects in the direction it is angled as the eyeglass arm is placed in said U-shaped opening, whereby said canted coil spring provides consistent pressure against said eyeglass arm; and securing a second U-shaped attachment mechanism to the second eyeglass arm, wherein a loop is created between the cord and the eyeglasses.

DETAILED DESCRIPTION OF THE DRAWINGS

The embodiments of the invention and the various features and advantages thereto are more fully explained with references to the non-limiting embodiments and examples that are described and set forth in the following descriptions of those examples. Descriptions of well-known components and techniques may be omitted to avoid obscuring the invention. The examples and drawings used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the claims.

All patents cited herein are incorporated by reference in their entirety.

As used herein, terms such as "a," "an," and "the" include singular and plural referents unless the context clearly demands otherwise.

As used herein, the term "about" means within 10% of a stated number.

As described herein, embodiments of the eyeglasses clip are typically made of metal. The clip provides a secure hold on a wide variety of eyeglass styles and eyeglasses having different width arms. A benefit of the various clip embodiments described herein, is that they do not scratch the arms or other part of the eyeglasses, they are attractive, they are lightweight and small, they do not rust or corrode, and they are able to be detachably secured so that they can be utilized on different eyeglasses. In further embodiments, these clips may also be made from plastic, plastic polymers, wood, or combinations of similar materials.

In a preferred embodiment, a retaining system includes two U-shaped clips and a string attached between the two clips. The eyeglass U-shaped clip (or retainer, U-shaped retaining member, or attachment member) connects to the eyeglass arm, preferably near the temple, not the rear of the arm. This connection point provides a secure and balanced attachment point, and prevents the situation where a clip unwittingly falls off the rear of the eyeglass arm, as is common in the prior art.

Figure 1A:
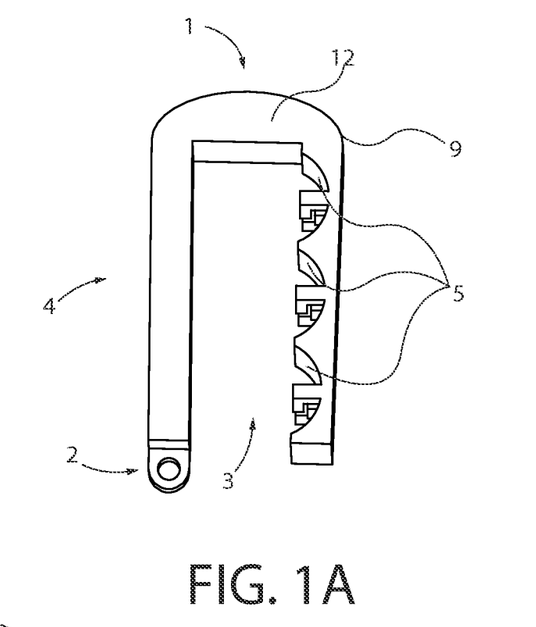
FIGS. 1A, 1B, and 1C, are drawings of one embodiment of an eyeglass retainer with and without attached springs.

Accordingly, an embodiment of the invention comprises a eyeglass clip 1, which is a "U" shaped housing having a clip opening 3, a front arm 4, and a rear arm 9 that together define the U-shape opening. At the open end of the front arm 4, a clip hole 2 provides for an attachment point to secure a leash, a chain, string, rope, or another securing device to the eyeglass clip 1. Positioned on the inside portion of the U-shaped opening and on the rear arm 9 side of the opening are three spring grooves 5. These spring grooves 5 have an arc of about 180 degrees or less that provide for a groove for a circular or ovular shaped spring to be attached inside said opening. The spring groove 5 are situated so that the springs sit sideways in the U-shaped opening, such that the circular opening of the spring faces to the sides 12 and 13 of the U-Shaped opening. The spring is further cantilevered at a slight angle (about 1-45 degrees), to one side of the width (see e.g. FIG. 5B). Indeed, in certain embodiments, the cantilevered angle provides that the top portion of the spring (as opposed to the bottom, which is in contact with the spring groove 5), extends past the left side 12 or right side 13 of the clip. Preferred angles are from about 1 to about 45 degrees, as measured from the vertical, and include all angles in between. When an implement engages the coil springs, the spring lays down and can extend past the 45 degrees, until it is simply flat (90 degrees from the vertical) against the arm of the U-shaped clip.

The spring grooves 5 extend the width of the eyeglass clip to the clip left side 12 and to the clip right side 13. The width of the eyeglass clip is about 5 mm. In other embodiments, the width can be between about 2 mm and about 20 mm. In further embodiments, the width of the front arm 4 and the rear arm 9 can be different.

Figure 1B:
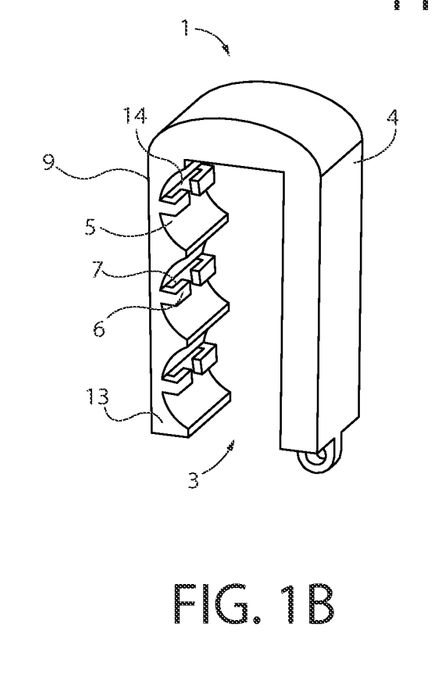

FIG. 1B provides a further detail of the spring groove 5 and with particular regard to the spring latch 6, and the spring latch opening 7 that are disposed of in the spring groove 5. The spring latches 6 are L shaped features having one end of the L attached to the spring groove 5 so that the one length of the L shape spring latch is perpendicular to the rear arm 9, and the remaining portion of the L feature extends away from the rear arm 9 wherein a portion of the L shaped spring latch is parallel to the rear arm 9. This creates a spring latch opening 7 between the parallel portion of the spring latch 6 and the bottom of the spring groove 5. The spring latch 6 then engages a portion of the spring, securing it into place.

In each spring groove 5, there are two spring latches 6, one positioned at the edge of each side of the eyeglass clip, with both openings pointed towards each other. This provides a latch central opening 14 between the opposing L-shaped spring latches 6. The latch central opening 14 provides space to insert a slanted/canted coil spring, wherein a portion of the circular coil spring is secured within the spring latch opening 7, thus securing the canted coil spring to the clip 1. In certain preferred embodiments, after a coil spring is inserted into this opening, an adhesive or weld can fill this latch central opening 14, thus securing the coil spring in place, but still allowing the spring to rotate or slightly move.

Figure 1C:
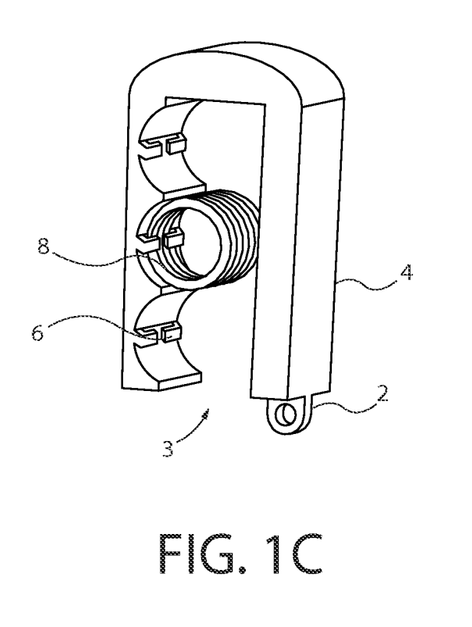

As depicted in FIG. 1C, a single coil spring is secured within the central spring groove 5, and the bottom portion of the spring is in contact with the spring groove 5 while the top of the spring extends into the U-Shaped opening.

A particular feature of the embodiment of FIG. 1C is the use of slanted/canted coil springs. The use of these canted coil springs is unique over the art as unlike other types of springs, in which the force is directly proportional to deflection, the canted coil springs produce a nearly constant force over the working spring deflection. This is particularly advantageous as the springs then provide a constant, or nearly constant amount of force between the front arm 4 of the U-shaped housing and the spring 8, and a feature, i.e. the eyeglass arm, is disposed of inside the trough of the U-shaped housing. This provides that a feature, whether a thick or a thin, is disposed of in the trough, the force applied to the feature from the springs is consistent.

The coil springs are secured within the U-shaped clip 1 so that the circular opening of the springs opens to each of the edges of the width of the U-shaped opening. Accordingly, when a body is inserted into the clip opening 3, the springs deflect to one side. This is typically the opposite orientation than how a spring is typically used, wherein the circular opening portion of the spring receives the pressure and compresses or extends against said pressure. In the typical scenario, greater pressure is exerted by the springs the more the spring is compressed. In comparison, the canted coil spring, being deflected on its side, exerts a consistent pressure against a body pressed against it, regardless of the size of the body presented.

Said another way, the canted coil spring compresses on the side of the coils, wherein a typical spring extends or contracts the coils. Therefore, a body, such as an eyeglass arm having a very thin dimension, or a larger dimension, so long as each are in contact with the coil spring and the opposing side of the U-shaped clip, will face similar pressure, instead of the different pressure from a typical spring orientation.

The coil springs may be advantageously coated with a rubber or silicon material to increase the friction and also prevent scratching from the metal or plastic spring to the eyeglasses arm. Indeed, the components of the clip may be coated with a thin layer of protectant material to prevent scratching and/or increase the friction to assist in holding the clip to the eyeglasses.

In a preferred embodiment, the U-shaped clip 1 has an opening 3 that has an opening width (space between the arms) of about 1-10 mm. The depth (from the bottom of the U-shape to the top) of the opening is about 5-30 mm, and wherein the width between the left 12 and right 13 sides of the clip is about 1-10 mm. In a further embodiment, three canted coil springs are secured to the rear arm 9 of one side of U-shaped housing. However, in other embodiments, one or more springs may be suitably utilized in the several embodiments. The other vertical arm, the front arm 4, of the trough, remains flat on the inside portion and may optionally, include a material or other feature to add friction to the side wall of the trough. For example, rubber, silicon, or other similar material may be added to the inside wall. Once a feature, such as the arm of a pair or eyeglasses, is inserted into the trough, the canted coil springs deflect and pressure is applied to the arm of the eyeglasses thereby securing the U-shaped clip 1 in place.

It is preferred that the canted coil springs are secured to the trough vertical arm so that the spring remains movable, that is, not rigidly secured to the vertical arm. By providing the spring the ability to move, even slightly, the lateral motion and rotation motion allows for a more secure insertion of the eyeglasses arm without scratching or damaging the eyeglasses arm. The springs are attached, therefore, through the opposing pair of spring latches, which are disposed of in the spring groove 5.

However, in certain embodiments, it may be preferred to solder, weld, laser weld, or otherwise securely attach the spring 8 in place inside the spring groove 5. The attachment may be to the bottom of the spring groove 5, to the spring latch 6, or both. Other means of securing the spring to the vertical arms, including wrapping the spring with wire, or other string or cord like material, wherein the wire, string, or cord, is wrapped around the spring 8 and the spring latch 6, to fasten it in place, but may provide some limited motion while providing a secure attachment. Finally, the use of adhesives may be preferable for ease of use, simple manufacturing, and for repair and replacement. Epoxy or cyanoacrylate type adhesives and other similar one or two part adhesives are suitable for use. Furthermore, flexible silicone based adhesives, or latex based adhesives may also be suitable for securing the spring but also for allowing a small amount of movement for the spring. It is suitable in certain circumstances to use more than one adhesive means to secure the springs to the vertical arms, for example, use of a silicone adhesive with a latching type mechanism may be preferred or use of a spot weld to secure the bottom of the spring to the spring groove 5 and a small amount of an adhesive to secure that weld.

Figure 4A:
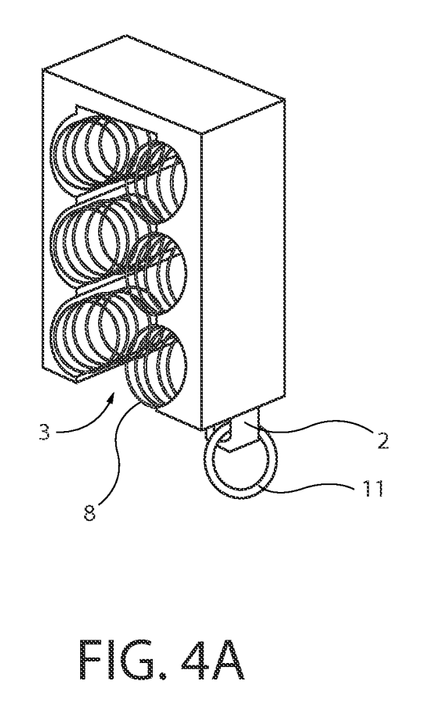
FIGS. 4A and 4B are drawings of an embodiment having six springs and a detail of a portion of a latch mechanism to secure the springs to the eyeglass retainer.

In other embodiments, it is appropriate to utilize coil springs on both sides of the vertical arms of the trough. For example, FIG. 4A depicts an embodiment having coil springs 8 attached to both sides of the U-shaped clip 1. Accordingly, each side of the U-shaped wall includes spring grooves 5 and canted coil springs.

Figure 2:
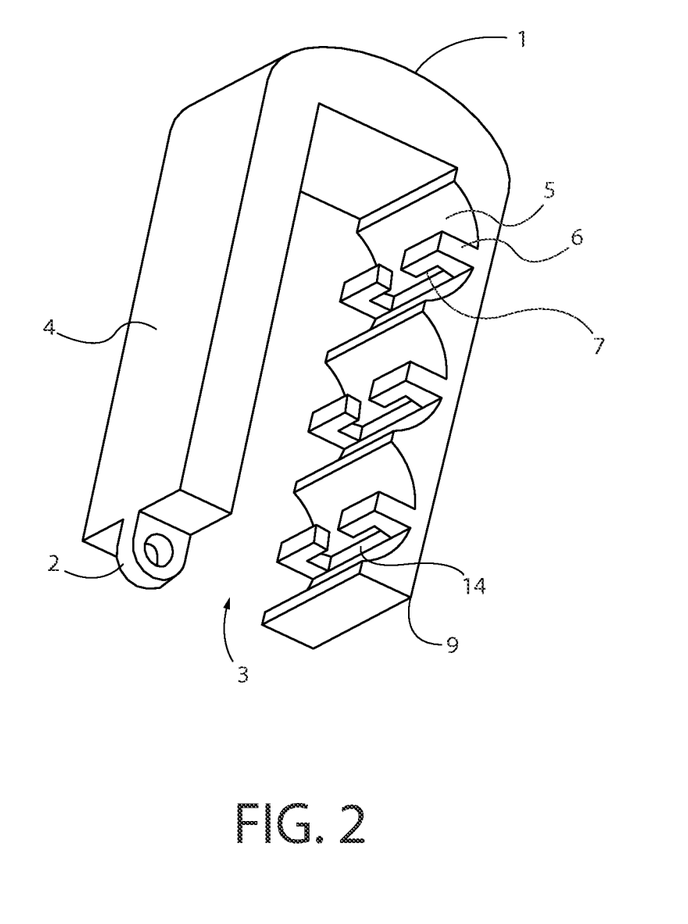
FIG. 2 is a detailed view of an embodiment of an eyeglass retainer without springs.

FIG. 2 provides a perspective view of the clip. This shows the spring groove 5, the spring latches 6, and the spring latch openings 7.

Figure 3A:
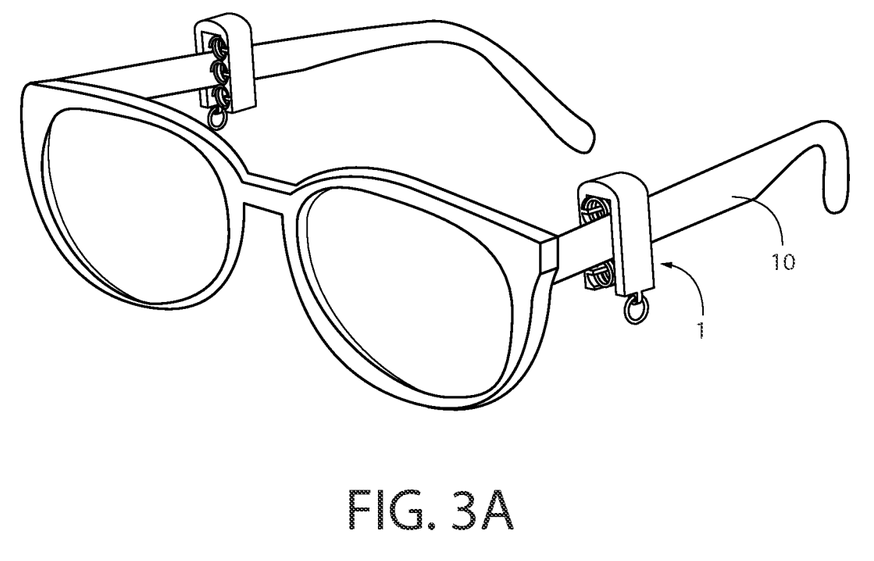
FIGS. 3A and 3B are drawings of an eyeglass retainer as attached to a pair of eyeglasses.
Figure 3B:
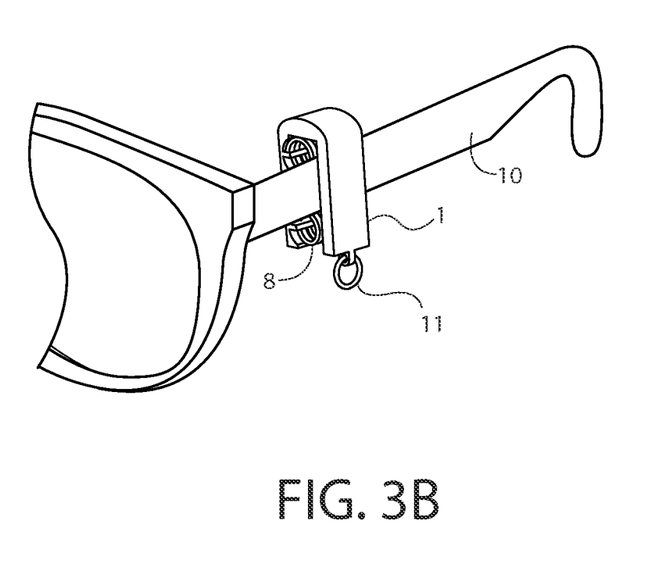

FIGS. 3A and 3B provide examples of how a clip 1 would fit on a pair of eyeglasses 10. FIG. 3A provides an example wherein springs 8 would only be positioned on the rear arm 9, and thus the springs would be in contact with the inside face of the eyeglasses arm. FIG. 3B, on the other hand, provides a detail of FIG. 3A.

FIG. 4A details the use of canted coil springs on each side of the U-Shaped arm. Indeed, instead of only 3 springs, secured to one side of the U-shaped clip 1, there are six springs, three attached to each of the vertical arms, the front arm 4 and the rear arm 9. The springs in such embodiment can be angled/cantilevered in the same direction, or positioned so that all springs on one arm are angled in one direction and the springs on the other side angled in the opposing direction.

Indeed, it is suitable for a U-shaped clip to use springs on one arm or both arms of the U-Shaped feature. A single spring may be suitable on one or both sides, or two, three, or more springs are appropriate. Furthermore, the dimensions listed above are relevant to a typical pair of eyeglasses, however, the size can be increased or decreased based on the particular needs of the user.

The size of the canted coil springs can also be modified. In certain embodiments, the canted coil springs touch the spring groove 5 and also extend to contact the opposing arm of the U-shaped opening. In other embodiments, the canted coil spring extends to only about the middle of the U-shaped opening, and thus a thicker eyeglass arm would be necessary for securing with such a design. Accordingly, such modifications can be made accordingly to one of ordinary skill in the art, based on the ultimate use and dimensions of products to be used with the eyeglasses holder.

Figure 4B:
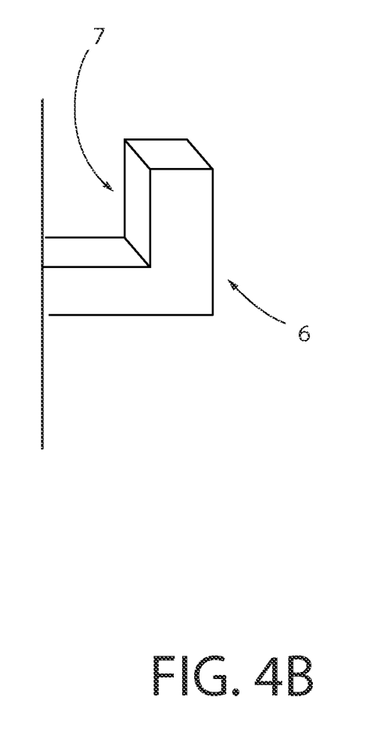
Figure 5A:
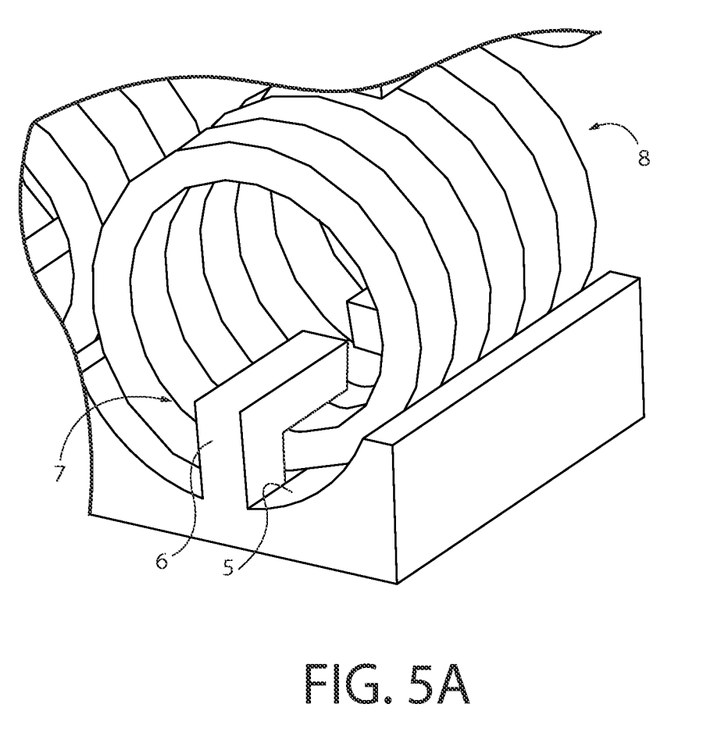
FIGS. 5A and 5B depict an embodiment of a spring groove, latch and a spring secured thereto and a view of the cantilevered angle of the coil springs.

FIG. 4B provides further and greater detail of the spring latch 6. Indeed, the spring latch 6 is an L-shaped feature attached at one end to the spring groove 5, and extending perpendicular from the wall, and thus providing that one portion of the L-shaped spring latch is then parallel to the wall. This provides the spring latch opening 7, which provides the space for the insertion of a spring. Indeed, FIG. 5A provides a detail of a coil spring 8 secured within a spring latch opening 7. As is depicted, a portion of the coil spring 8 is secured between the spring groove 5, and the underside of the spring latch 6, which is the spring latch opening 7 space. In further embodiments, the L-shape feature can be modified to have slight angles up, or down, to engage or secure a spring within the spring latch opening 7.

Figure 5B:
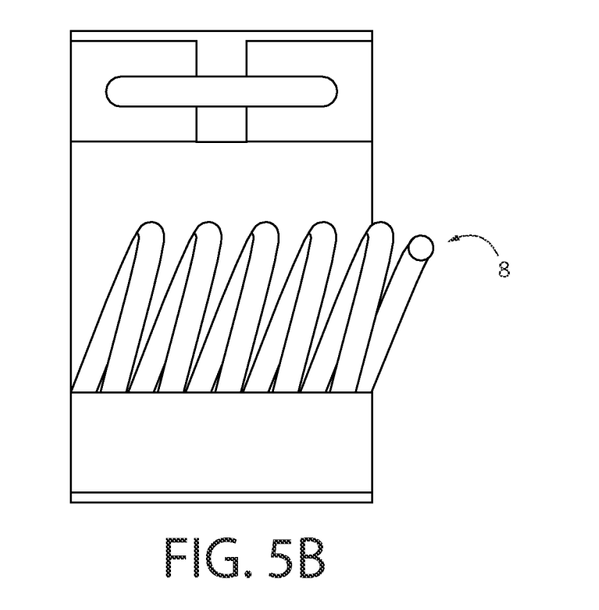

FIG. 5B depicts a side cutout view of the angle of the coiled springs. Indeed, the spring is extending past the side wall of the clip. Accordingly, when an implement is placed into the opening, the springs would compress by flattening and extending further to the right side of the image, that is, the springs compress further in the direction they are already leaning This provides that the spring presses back on the implement with a consistent amount of force, and thereby secures the implement between the spring and the opposing wall (or springs).

Figure 6A:
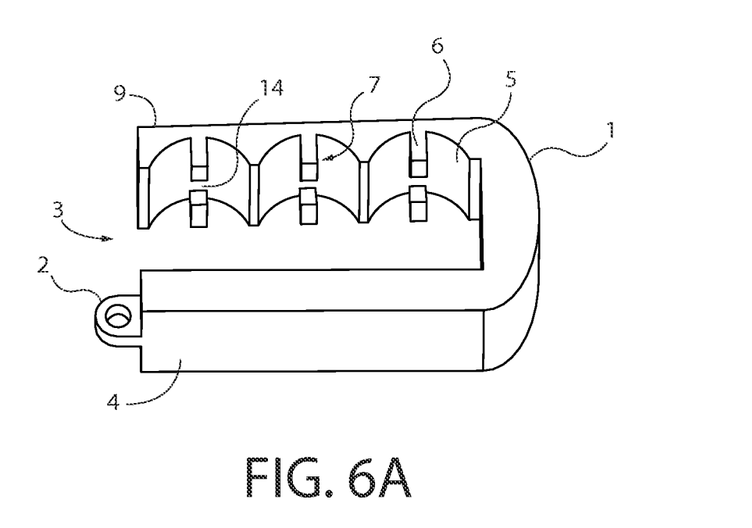
FIGS. 6A and 6B are drawings of an eyeglass retainer with and without springs secured thereto.
Figure 6B:
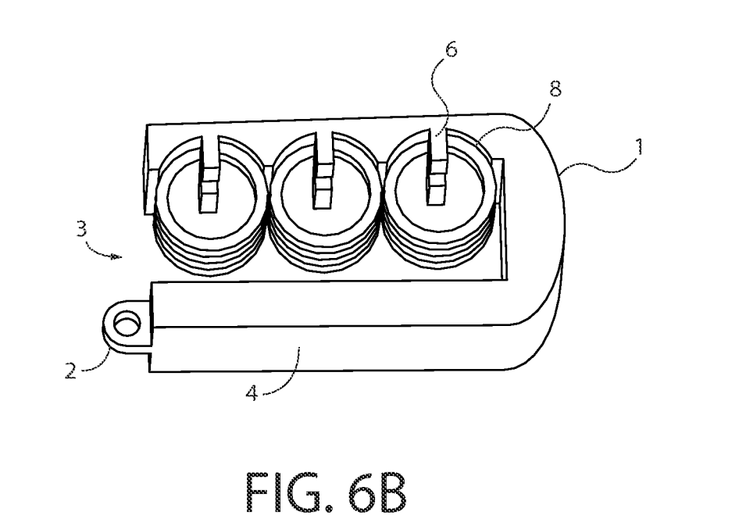

FIGS. 6A and 6B depict further embodiments of the eyeglass clip 1. In FIG. 6A, the clip 1 is shown without the coil springs 8. This allows clear depiction of the spring latches 6. In contrast, in FIG. 6B, the coil springs 8 are depicted in place, as secured by the spring latches 7.

Figure 7A:
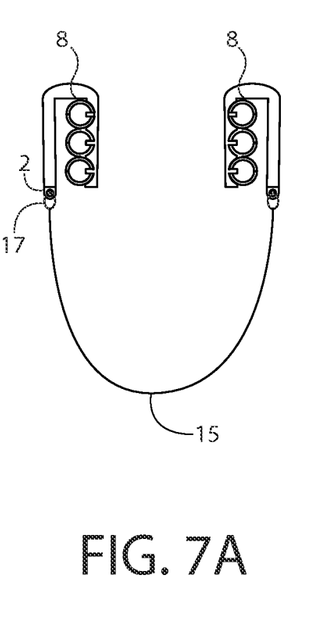
FIGS. 7A and 7B depict an embodiment having a securing length attached to a pair of eyeglass retainers.
Figure 7B:
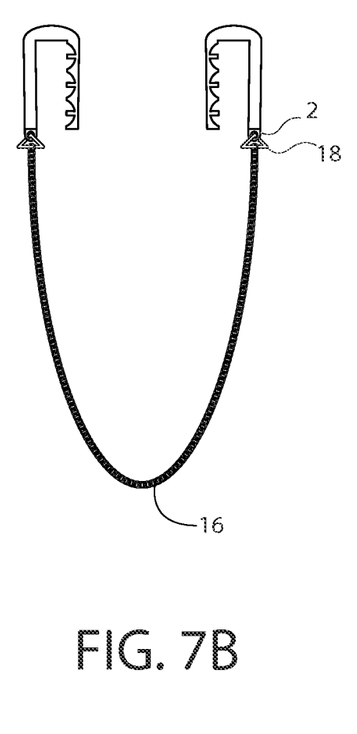

FIGS. 7A (depicted with springs) and 7B (depicted without springs) depict two different embodiments of clip attachment features. Indeed, FIGS. 7A and 7B further comprise a clip strap attachment ring 17 and clip strap attachment article 18. These features, 17 and 18, secure to the clip hole 2, and provide the ability to then secure the clips 1 to a retainer length 15, or chain 16. A retainer length is a cord, a string, a chain, or other length of material that is suitable for attaching to the clip and to then secure around and rest around the back of the head or neck of a wearer. Other shaped attachment features besides a ring and triangle are suitable for use, and any number of cords, strings, chains, etc. can be utilized to connect a pair of clips 1. Indeed, the clip strap attachment ring 17, in some embodiments, is able to be opened and closed, and so the string device can be changed. This is advantageous when the string should be changed to match the eyeglasses to which the clips are attached, or to match a particular outfit, for example.

The cord or string is of sufficient length to be able to fit over and around the head of a person wearing the eyeglasses and should fit comfortable behind the head. In many cases, the string, cord, chain, or other attachment length, sits just at the back of the neck. This retainer length provides that if the eyeglasses are accidentally knocked off the person's face, the eyeglasses will not be lost. Furthermore, a person can take off the eyeglasses and let them hang around their neck without losing them.

Methods of securing a cord to a pair of eyeglasses utilizing a U-shaped eyeglass clip provide a simple, stylish and secure mechanism for securing eyeglasses to a wearer. By attaching each end of a cord to a U-shaped eyeglass clip, a device is prepared for securing to the eyeglasses. By then sliding a U-shaped eyeglass clip attached to each end of the cord to each of the arms of a pair of eyeglasses, a user can securely attach the cord to the eyeglasses for use.

Although the present invention has been described in considerable detail, those skilled in the art will appreciate that numerous changes and modifications may be made to the embodiments and preferred embodiments of the invention and that such changes and modifications may be made without departing from the spirit of the invention. It is therefore intended that the appended claims cover all equivalent variations as fall within the scope of the invention.

What is claimed is:

1. An eyeglass retaining device comprising two U-shaped retainers and a retaining cord, wherein the ends of the retaining cord are attached to the U-shaped retainers; wherein the U-shaped retainer comprises a U-shaped body, having an opening on one side, wherein said opening is of sufficient depth to secure within said opening the arm of eyeglasses, wherein the U-shaped retainer comprises at least one canted coil spring secured to the inside portion of one arm of the U-Shaped body such that the spring extends along the width of the U-shaped body and is angled towards one side of the U-shaped body; and wherein the canted coil spring deflects in the direction it is angled upon a force being exerted upon said coil spring from an implement, whereby said canted coil spring provides consistent pressure against said implement.

2. The eyeglass retainer of claim 1 further comprising at least one spring groove positioned on one arm securing the coil spring, such that the coil spring is disposed of within the spring groove on said arm.

3. The eyeglass retainer of claim 2 further comprising a pair of spring latches secured within said spring groove, wherein said spring latches engage a portion of the coil spring to secure the coil spring to the U-shaped body.

4. The eyeglass retainer of claim 2 comprising three spring grooves, wherein each spring groove comprises a pair of opposing spring latches securing a canted coil spring in place in each said spring groove.

5. The eyeglass retainer of claim 1 further comprising an adhesive applied to said coil spring to secure the coil spring to the U-shaped body.

6. The eyeglass retainer of claim 1 further comprising a flexible adhesive applied to said coil spring to secure the coil spring to the U-shaped body.

7. The eyeglass retainer of claim 1 comprising at least one canted coil spring secured on each of the two arms of the U-shaped body.

8. An eyeglass retainer having a cord and two retaining members, each retaining member having a generally U-Shaped body, a height, a width, two sides, an opening length, and an attachment member for the cord positioned on one arm of the U-shaped body; wherein secured along at least one arm of the U-shaped body are three canted coil springs, having a circular opening, which are oriented sideways, so that the circular openings are positioned towards to the width of the U-shaped body; and wherein the canted coil spring is cantilevered at an angle between about 1 and 30 degrees towards one side.

9. The eyeglass retainer of claim 8 wherein the coil springs are secured along both arms of the U-shaped body.

10. The eyeglass retainer of claim 8 wherein the cord, having two ends, such that one end is attached to the attachment member of a first retaining member, and the second end is attached to one arm of a second retaining member.

11. The eyeglass retainer of claim 8 further comprising three spring grooves positioned on one arm, such that the coil springs are disposed of within the spring grooves on said arm.

12. The eyeglass retainer of claim 11 further comprising a pair of spring latches secured within each of said spring grooves, wherein said spring latches engage a portion of the coil springs to secure the coil springs to the U-shaped body.

13. The eyeglass retainer of claim 11 further comprising an adhesive applied to the spring groove to secure the coil springs to the U-shaped body.

14. The eyeglass retainer of claim 11 further comprising a flexible adhesive applied to the spring groove secure the coil spring to the U-shaped body.

15. A method of securing a retaining cord to a pair of eyeglasses comprising:
   a. attaching a U-shaped attachment member to each terminal end of the cord, wherein each U-shaped attachment member comprises a U-shaped body and a canted coil spring, wherein at least one canted coil spring is secured to the inside portion of one arm of the U-shaped body and extending along the duration of the width of the U-shaped body and angled towards one side of the U-shaped body;
   b. securing a first U-shaped attachment member to one eyeglass arm, wherein the canted coil spring deflects in the direction it is angled as the eyeglass arm is placed in said U-shaped body, whereby said canted coil spring provides consistent pressure against said eyeglass arm; and
   c. securing a second U-shaped attachment member to the second eyeglass arm, wherein a loop is created between the cord and the eyeglasses.

16. The method of claim 15, wherein the U-shaped attachment member further comprises at least one spring groove positioned on one arm such that the coil spring is disposed of within the spring groove on said arm.

17. The method of claim 16, wherein the U-shaped attachment member further comprises a pair of spring latches positioned within said spring groove, wherein said spring latches engage a portion of the spring securing said spring within said spring groove.

\* \* \* \* \*